United States Patent [19]

Wu et al.

[11] Patent Number: 5,373,074
[45] Date of Patent: Dec. 13, 1994

[54] FREE RADICAL SOLUTION POLYMERIZATION OF VINYLPYRROLIDONE

[75] Inventors: Chi-San Wu; James F. Curry, both of Wayne, N.J.; James P. Cullen, Bartonsville, Pa.

[73] Assignee: ISP Investments Inc., Wilmington, Del.

[21] Appl. No.: 17,155

[22] Filed: Feb. 12, 1993

[51] Int. Cl.$^5$ .............. C08F 4/04; C08F 4/34; C08F 126/10
[52] U.S. Cl. .................. 526/218.1; 526/227; 526/264
[58] Field of Search .............. 526/264, 218.1, 227

[56] References Cited

U.S. PATENT DOCUMENTS 4,554,312 11/1985 Barabas et al. .............. 524/808
5,156,914 10/1992 Shih .............. 428/402.22

FOREIGN PATENT DOCUMENTS 1021121 2/1966 United Kingdom .

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

A free radical solution process for making PVP polymers having a molecular weight corresponding to a K-value of about 30-150, a narrow molecular weight distribution represented by a polydispersity of about 3 to 6, and a residual VP monomer level of less than 0.1%, which comprises:

(a) precharging a reaction mixture of vinylpyrrolidone monomer and water in a solids contents w/w VP/$H_2O$ of about 5-50%, and a dual free radical initiator system which comprises both low and high decomposition temperature free radical initiators whose 10-hour half-life temperature decomposition constants differ from each other by more than 5° C., the low and high temperature initiators being present, respectively, in an amount of about 0.05-0.5%, and about 0.1-0.5%, by weight of the VP monomer, (b) polymerizing said monomer in said reaction mixture at a temperature near or above the 10-hour decomposition temperature of said low temperature initiator, and (c) after substantially all of the VP monomer has been converted to PVP polymer, continuing the polymerization at the same temperature as in (b), or at a higher temperature near or above the decomposition temperature of the high 10-hour temperature initiator, to complete the polymerization and to reduce the residual VP monomer level to less than 0.1%.

1 Claim, No Drawings

FREE RADICAL SOLUTION POLYMERIZATION OF VINYLPYRROLIDONE

BACKGROUND OF THE INVENTION

1. Field of the Invention

This invention relates to free radical solution polymerization, and, more particularly, to polymerization of vinylpyrrolidone (VP) to polyvinylpyrrolidone (PVP) polymer using a predetermined initiator system to control the molecular weight (MW), the molecular weight distribution (MWD), and the residual VP monomer level of the PVP product.

2. Description of the Prior Art

Free radical solution polymerization is used widely in industry to prepare homopolymers and copolymers. See, for example, U.S. Pat. Nos. 4,433,112; 4,554,311; 4,058,655; 4,053,696; 4,330,451; 3,862,915; and 4,886,861. In such process, the monomer, for example, vinylpyrrolidone, the solvent and the free radical initiator, are mixed and reacted at a selected temperature for a given period of time. Control of both the reaction temperature and viscosity of the reactants during the process has been considered essential in order to obtain a polymer of predetermined composition, MW, and viscosity, and having a narrow MWD.

It is also desired to carry out a free radical solution polymerization process so that the residual monomer content is quite low, preferably less than 0.1%. Polymers having a low residual monomer content can be made by adding the initiator in stages, or continuously, during polymerization, or by providing a booster amount of the initiator in the final stage of the process. However, these techniques require rather complicated manufacturing procedures. Furthermore, the viscosity of the reaction mixture increases as polymerization proceeds; accordingly, it was difficult to intimately mix such successive portions of the initiator to the viscous mass which resulted in a localized high concentration of free radicals and a considerable variation in the MW, MWD and viscosity of the final product.

For these reasons, a single initiator is preferred in free radical solution polymerizations. Unfortunately, the resultant initiator concentration after 99% of the monomer has been converted to polymer is too low to effectively reduce the residual monomer level from 1% to less than 0.1%, and in a timely manner.

Accordingly, it is an object of this invention to provide a process for free radical solution polymerization of monomers to provide polymers of predetermined MW, a narrow MWD, a high viscosity, and a low residual monomer content.

A particular object herein is to provide a process for free radical solution polymerization of vinylpyrrolidone to polyvinylpyrrolidone having a K-value of about 30–150, an MWD of 3–6, and a residual monomer content of less than 0.1%.

These and other objects and features of the invention will be made apparent from the following more particular description.

SUMMARY OF THE INVENTION

What is provided herein is a free radical solution process for making PVP polymers having a molecular weight corresponding to a K-value of about 30–150, a narrow molecular weight distribution represented by a polydispersity of about 3 to 6, and a residual VP monomer level of less than 0.1%, which comprises:

(a) precharging a reaction mixture of vinylpyrrolidone monomer and water in a solids contents w/w VP/$H_2O$ of about 5–50%, and a dual free radical initiator system which comprises both low and high decomposition temperature free radical initiators whose 10-hour half-life temperature decomposition constants differ from each other by more than 5° C., the low and high temperature initiators being present, respectively, in an amount of about 0.05–0.5%, and about 0.1–0.5%, by weight of the VP monomer, (b) polymerizing said monomer in said reaction mixture at a temperature near or above the 10-hour decomposition temperature of said low temperature initiator, and (c) after substantially all of the VP monomer has been converted to PVP polymer, continuing the polymerization at the same temperature as in (b), or at a higher temperature near or above the decomposition temperature of the high 10-hour temperature initiator, to complete the polymerization and to reduce the residual VP monomer level to less than 0.1%.

DETAILED DESCRIPTION OF THE INVENTION

In this invention, the free radical polymerization process for making PVP homopolymers or copolymers allows for ease of temperature and viscosity control, reduces the residual monomer level to less than 0.1% without adding extra initiator in the final stage of polymerization, and is capable of making polymers with a uniform (narrow) MWD and a high bulk solution (Brookfield) viscosity. The important features of the process are as follows:

(1) The use of mixed low and high temperature initiators (two or more) with 10 hour half-life temperatures different from each other by at least several degrees. Two initiators are required, but more than two are also workable.

The primary function of the low temperature initiator is to produce a PVP polymer of a desired molecular weight; while the primary function of the high temperature initiator is to reduce the residual monomer level to less than 0.1%. The high temperature initiator remains "relatively dormant" as compared to the low temperature initiator in the beginning of the reaction, and becomes "dominant" in the final stage of the reaction, especially when the temperature is raised. This mixed initiator system thus precludes the problems overheating, drastic viscosity build-up, difficulty in removing residual monomer, previously associated with a single initiator polymerization system.

The amount of the low temperature initiator used in the mixed initiator system of the invention also is less than the amount of initiator used in a single initiator system to make polymers of similar MW and solids content.

(2) The dual mixture of a low and high temperature initiator can be added at the beginning of the polymerization. Final stage addition of the high temperature initiator is workable but is not necessary.

(3) The temperature of the reaction at the first stage is controlled to be close to or above the lowest of the 10-hour half-life temperatures of the initiator mixture. After the majority of the monomer has reacted, it is preferable, but not necessary, to increase the reaction temperature to close to or above the next lowest of the 10-hour half-life temperature of the initiator mixture to reduce the residual monomer level to less than 0.1%.

(4) The final residual monomer level can be reduced to less than 0.1% by holding the reaction mixture for a few hours or less in each of the two stages mentioned in (3).

(5) The uniform or narrow MWD of the polymer prepared in the mixed initiator system of the invention provides a polymer having a higher bulk solution (Brookfield) viscosity than prior polymers having the broad MWD value, at equivalent K-value (molecular weight) and concentration levels.

(6) Adjusting the ratio of the dual initiator mixture, and/or % solids, will provide polymers of different K-value (molecular weight) in the process of the invention.

(7) VP and other homopolymers and copolymers can be polymerized in water and organic solvents.

The invention will be described in more detail by reference to the following examples.

EXAMPLE 1

A 1-liter, 5-necked, jacketed glass reaction flask is equipped with a stirring shaft for mixing, a water-cooled condenser to prevent vapor loss, a thermocouple to monitor temperature, a rubber septum for introducing the initiators and for removing samples periodically, and a nitrogen sparge tube. The flask allows for a positive pressure of nitrogen to be maintained. Accordingly, nitrogen is bubbled through the reaction mixture for 20 minutes before starting the polymerization reaction.

The reaction mixture was prepared by mixing 169 g of vinylpyrrolidone (VP) and 599 g of distilled/deionized water to achieve a 22% (w/w) VP/H2O mixture. 0.02 g of EDTA was added and the mixture was stirred for 30 minutes to dissolve the EDTA. The pH of the mixture was 9.1. Then the mixture was added to the reaction flask.

The reaction mixture then was heated to 57° C. and 0.3% (v/w% of VP), 677 µl, of Lupersol 11* (t-butyl-peroxy pivalate) initiator was added. Then 0.2% (v/w % of VP), 1.69 ml, of Vazo 67** (2,2-azo(2-methyl butyronitrile)/Vp mixture is added. The Vazo 67/VP mixture was prepared just before addition by adding 1 g of Vazo 67 to 4 g of VP and mixing for 1 minute. Then the temperature was controlled between 60° to 64° C. for two hours. Thereafter the temperature was increased to 80° C. and held for another 2 hours to complete the reaction. The polyvinylpyrrolidone (PVP) polymer product had a K-value of 74.7, a polydispersity of 3.2, a solids content of 22.4%, and residual VP content of only 0.06%.

*Lupersol 11—obtained as a 75% active solution of the initiator in mineral spirits from the Pennwalt Chemicals Division of NA Atochem (Phila, Pa.); 10-hour half-life, t ½, in trichloroethylene is 58° C.
**Vazo 67—obtained as a powder from dupont

EXAMPLE 2

The dual initiator procedure of Example 1 was followed using 0.125% (v/w % of VP) of Lupersol 11. The PVP obtained had a K-value of 91.3, a polydispersity of 4.6, a solids content of 23.8%, and a residual VP level of 0.08%.

EXAMPLE 3

The dual initiator procedure of Example 1 was followed using 0.1% (v/w % of VP) of Lupersol 11. The PVP obtained had a K-value of 94.4, a polydispersity of 4.6, a solids content of 22.7%, and a residual VP level of 0.07%.

EXAMPLE 4

The dual initiator procedure of Example 1 was followed using 0.06% (v/w % of VP) of Lupersol 11, and 182 g of deionized water was added after 2 hours before raising the temperature to 80° C. to reduce viscosity. The PVP product obtained had a K-value of 101.3, a polydispersity 4.8, a solids content of 18.9%, and a residual VP level of 0.07%.

EXAMPLES 5–9

The dual initiator procedure of Example 1 is followed using the following combinations of low and high temperature initiators to produce PVP having similar K-values, polydispersity and residual monomer levels as obtained for the Lupersol 11/Vazo 67 system.

| | | DUAL INITIATOR POLYMERIZATIONS | | | | |
|---|---|---|---|---|---|---|
| Example | Low Temp. Initiator | 10-hour Half-life Temp (°C.) | 1st Stage Reaction Temp (°C.) | High Temp. Initiator | 10-Hour Half-Life Temp (°C.) | 2nd Stage Reaction Temp (°C.) |
| 5 | Lupersol 11 | 58 | 63 | Vazo 88 | 88 | 95 |
| 6 | Lupersol 11 | 58 | 63 | Lupersol 80 | 82 | 92 |
| 7 | Lupersol 11 | 58 | 63 | Lupersol 575 | 75 | 85 |
| 8 | Vazo 67 | 67 | 70 | Vazo 88 | 88 | 95 |
| 9 | Vazo 52 | 52 | 55 | Vazo 67 | 67 | 80 |

1. A free radical solution process for making PVP polymers having a molecular weight corresponding to a K-value of about 40–150, a narrow molecular weight distribution represented by a polydispersity of about 3 to less than 6, and a residual VP monomer level of less than 0.1%, which comprises:

(a) precharging a reaction mixture of vinylpyrrolidone monomer and water in a solids contents w/w VP/H2O of about 5–50%, and a dual free radical initiator system which comprises both low and high decomposition temperature free radical initiators whose 10-hour half-life temperature decomposition constants differ from each other by more than 5° C., the low and high temperature initiators being present, respectively, in an amount of about 0.05–0.5%, and about 0.1–0.5%, by weight of the VP monomer, wherein said low temperature initiator is t-butylperoxy pivalate and said high temperature initiator is 2,2-azo(2-methylbutyronitrile), (b) polymerizing said monomer in said reaction mixture at a temperature near or above the 10-hour decomposition temperature of said low temperature initiator, and (c) after substantially all of the VP monomer has been converted to PVP polymer, continuing the polymerization at a higher temperature near or above the decomposition temperature of the high 10-hour temperature initiator, to complete the polymerization and to reduce the residual VP monomer level to less than 0.1%.

* * * * *